United States Patent
Cheng et al.

(10) Patent No.: US 10,495,932 B2
(45) Date of Patent: Dec. 3, 2019

(54) DISPLAY SUBSTRATE AND DISPLAY DEVICE COMPRISING FIRST AND SECOND SUB-PIXEL ELECTRODES EACH HAVING A TRUNK PORTION AND AN OPENING STRUCTURE AND FIRST AND SECOND LIGHT-SHIELDING PORTIONS

(71) Applicant: BOE TECHNOLOGY GROUP CO., LTD., Beijing (CN)

(72) Inventors: Hongfei Cheng, Beijing (CN); Jianbo Xian, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 119 days.

(21) Appl. No.: 15/525,789

(22) PCT Filed: Nov. 9, 2016

(86) PCT No.: PCT/CN2016/105210
§ 371 (c)(1),
(2) Date: May 10, 2017

(87) PCT Pub. No.: WO2017/113996
PCT Pub. Date: Jul. 6, 2017

(65) Prior Publication Data
US 2018/0095314 A1    Apr. 5, 2018

(30) Foreign Application Priority Data
Dec. 28, 2015  (CN) .................... 2015 2 1108609 U (51) Int. Cl.
*G02F 1/1362* (2006.01)
*G02F 1/1343* (2006.01)
(Continued)

(52) U.S. Cl.
CPC ...... *G02F 1/136209* (2013.01); *G02F 1/1343* (2013.01); *G02F 1/133512* (2013.01);
(Continued)

(58) Field of Classification Search
None
See application file for complete search history.

(56) References Cited

U.S. PATENT DOCUMENTS

2002/0093614 A1*  7/2002 Moon ............... G02F 1/134363
349/141
2010/0123845 A1   5/2010 Kim
(Continued)

FOREIGN PATENT DOCUMENTS

CN        102037400 A       4/2011
CN        204166255 U       2/2015
(Continued)

OTHER PUBLICATIONS

International Search Report dated Jan. 26, 2017.

*Primary Examiner* — Paul C Lee
(74) *Attorney, Agent, or Firm* — Dilworth & Barrese, LLP.; Michael J. Musella, Esq.

(57) ABSTRACT

A display substrate and a display device are provided. The display substrate includes: a base substrate, a pixel electrode provided on the base substrate; and a light-shielding pattern. The pixel electrode can include first sub-pixel electrodes and second sub-pixel electrodes arranged alternately, the first sub-pixel electrode includes a first trunk portion and a first opening structure provided in a periphery of the first trunk portion, the second sub-pixel electrode includes a second trunk portion and a second opening structure provided in a periphery of the second trunk portion, the light-shielding pattern includes a first light-shielding portion, and the first light-shielding portion is provided at an end portion of a gap
(Continued)

between the first sub-pixel electrode and the second sub-pixel electrode.

16 Claims, 5 Drawing Sheets

(51) Int. Cl.
    *G02F 1/1335*     (2006.01)
    *G02F 1/1337*     (2006.01)

(52) U.S. Cl.
    CPC ............... *G02F 1/133707* (2013.01); *G02F 2001/134345* (2013.01)

(56) References Cited

U.S. PATENT DOCUMENTS

| | | | |
|---|---|---|---|
| 2012/0162559 A1 | 6/2012 | Kim | |
| 2014/0118667 A1* | 5/2014 | Cho | G02F 1/134309 349/106 |
| 2014/0160401 A1* | 6/2014 | Yonemura | G02F 1/134309 349/96 |
| 2015/0241743 A1* | 8/2015 | Jung | G02F 1/136286 349/43 |
| 2015/0277166 A1* | 10/2015 | Kim | G02F 1/133707 349/128 |

FOREIGN PATENT DOCUMENTS

| | | | | |
|---|---|---|---|---|
| CN | 204496141 U | 7/2015 | | |
| CN | 205247020 U | 5/2016 | | |
| JP | 2011149968 A | * | 8/2011 | ....... G02F 1/133555 |

* cited by examiner

DISPLAY SUBSTRATE AND DISPLAY DEVICE COMPRISING FIRST AND SECOND SUB-PIXEL ELECTRODES EACH HAVING A TRUNK PORTION AND AN OPENING STRUCTURE AND FIRST AND SECOND LIGHT-SHIELDING PORTIONS

TECHNICAL FIELD

Embodiments of the present disclosure relate to a display substrate and a display device.

BACKGROUND

With continuous development of a display technology, a liquid crystal display technology is widely used in a television, a mobile phone, and a public information display field. The liquid crystal display technology may be divided into two major categories: i.e., a parallel electric field technology and a vertical electric field technology; the parallel electric field technology refers to that an electric field direction in a liquid crystal display device is parallel to a base substrate, and the vertical electric field technology refers to that the electric field direction in the liquid crystal display device is perpendicular to the base substrate.

In a field of a large-scale wide-viewing-angle liquid crystal display device, the vertical electric field technology has been widely used.

SUMMARY

Embodiments of the present disclosure provide a display substrate and a display device, configured for avoiding a light leakage phenomenon.

At least one embodiment of the present disclosure provides a display substrate, including: a base substrate; a pixel electrode, provided on the base substrate; and a light-shielding pattern, wherein, the pixel electrode includes first sub-pixel electrodes and second sub-pixel electrodes arranged alternately, the first sub-pixel electrode includes a first trunk portion and a first opening structure provided in a periphery of the first trunk portion, the second sub-pixel electrode includes a second trunk portion and a second opening structure provided in a periphery of the second trunk portion, the light-shielding pattern includes a first light-shielding portion, and the first light-shielding portion is provided at an end portion of a gap between the first sub-pixel electrode and the second sub-pixel electrode.

For example, in the display substrate provided by an embodiment of the present disclosure, opening directions of the first opening structure and the second opening structure on both sides of the end portion of the gap are different.

For example, in the display substrate provided by an embodiment of the present disclosure, the first light-shielding portion is further provided in a peripheral region of the end portion of the gap between the first sub-pixel electrode and the second sub-pixel electrode.

For example, in the display substrate provided by an embodiment of the present disclosure, the first opening structure includes a first interdigital structure or a first slit structure, and the second opening structure includes a second interdigital structure or a second slit structure.

For example, in the display substrate provided by an embodiment of the present disclosure, the light-shielding pattern further includes a protruding portion connected with the first light-shielding portion and having a top protruding toward the gap.

For example, in the display substrate provided by an embodiment of the present disclosure, a position of the first light-shielding portion corresponding to the protruding portion is provided concavely toward the gap, or, the position of the first light-shielding portion corresponding to the protruding portion is provided protruding away from the gap.

For example, in the display substrate provided by an embodiment of the present disclosure, the protruding portion partly overlaps the first sub-pixel electrode and the second sub-pixel electrode on both sides of the gap.

For example, in the display substrate provided by an embodiment of the present disclosure, a shape of the protruding portion includes a trapezoid or a triangle.

For example, in the display substrate provided by an embodiment of the present disclosure, a center line of the protruding portion and a center line of the gap coincide with each other.

For example, the display substrate provided by an embodiment of the present disclosure, further includes: gate lines, data lines and pixel units located above the base substrate, wherein, each of the pixel units is provided therein with the first sub-pixel electrode and the second sub-pixel electrode, the gate line is located between the first sub-pixel electrode and the second sub-pixel electrode, adjacent gate lines and adjacent data lines enclose a display unit, each of the display units includes the first sub-pixel electrode in one of the pixel units and the second sub-pixel electrode in adjacent pixel unit thereto.

For example, in the display substrate provided by an embodiment of the present disclosure, the light-shielding pattern further includes a branch portion connected with the first light-shielding portion and extending in a data line direction.

For example, in the display substrate provided by an embodiment of the present disclosure, the branch portion and the data line are provided overlapping each other.

For example, in the display substrate provided by an embodiment of the present disclosure, the first sub-pixel electrode includes two root portions arranged intersecting with each other and a plurality of branch electrodes provided on the root portions with a slit therebetween, the second sub-pixel electrode includes two root portions arranged intersecting with each other and a plurality of branch electrodes provided on the root portions with a slit therebetween; and the light-shielding pattern further includes: a second light-shielding portion, the second light-shielding portion overlapping at least one end portion of at least one of the root portions.

For example, in the display substrate provided by an embodiment of the present disclosure, the second light-shielding portion further overlaps a peripheral region of at least one end portion of the at least one of the root portions.

For example, in the display substrate provided by an embodiment of the present disclosure, the second light-shielding portion further overlaps an end portion, away from the gap, of the root portion provided in a data line direction.

For example, in the display substrate provided by an embodiment of the present disclosure, the second light-shielding portion further overlaps a peripheral region of the end portion, away from the gap, of the root portion provided in the data line direction.

For example, in the display substrate provided by an embodiment of the present disclosure, a shape of the second light-shielding portion includes a trapezoid or a triangle.

For example, the display substrate provided by an embodiment of the present disclosure, further includes: a common electrode line, wherein, the common electrode line is located between the first sub-pixel electrode and the second sub-pixel electrode in the pixel unit, and located between the first sub-pixel electrode and adjacent gate line thereto, and the branch portion is a pattern extending from the common electrode line.

For example, the display substrate provided by an embodiment of the present disclosure, further includes: a common electrode line, wherein, the common electrode line is located between the first sub-pixel electrode and the second sub-pixel electrode in the pixel unit, and located between the first sub-pixel electrode and adjacent gate line thereto, and the second light-shielding portion is a pattern extending from the common electrode line.

At least one embodiment of the present disclosure provides a display device, comprising: a display substrate; and a counter substrate, provided opposite to the display substrate, the display substrate including the above-described display substrate.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meanings as understood by those ordinarily skilled in the art. "First", "second" and similar words used in the present disclosure do not represent any sequence, quantity or importance and merely intend to differentiate different composite parts. Likewise, words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is a described object is changed, the relative positional relationship may also be correspondingly changed.

Usually, a pixel electrode in a display device of a wide-viewing-angle technology may include two sub-pixel electrodes, so as to enhance a viewing angle of the display device. In addition, the sub-pixel electrode may include an opening structure (for example, a interdigital structure or a slit structure), so as to be applied to a display device in which a polymer monomer or a chiral agent is doped in a liquid crystal material, to achieve stable alignment, improvement of a liquid crystal reaction rate, improvement of the viewing angle and other effects. However, since directions of edge electric fields of adjacent opening structures (for example, the interdigital structure or the slit structure) in the two sub-pixel electrodes are not consistent, under an action of the edge electric field of the opening structure (for example, the interdigital structure or the slit structure), arrangement of liquid crystal molecules will deviate from a predetermined alignment direction, resulting in light leakage.

Embodiments of the present disclosure provide a display substrate and a display device. The display substrate includes: a base substrate, a pixel electrode provided on the base substrate, and a light-shielding pattern. The pixel electrode may include first sub-pixel electrodes and second sub-pixel electrodes arranged alternately, the first sub-pixel electrode includes a first trunk portion and a first opening structure provided in a periphery of the first trunk portion, the second sub-pixel electrode includes a second trunk portion and a second opening structure provided in a periphery of the second trunk portion, the light-shielding pattern includes a first light-shielding portion, and the first light-shielding portion is provided at an end portion of a gap between the first sub-pixel electrode and the second sub-pixel electrode. As a result, the light-shielding pattern can cover a region where the first opening structure and the second opening structure are adjacent to each other, avoid a light leakage phenomenon due to inconsistency of directions of the edge electric fields of the adjacent opening structures, so that display quality of the display substrate and the display device using the same can be improved.

Hereinafter, the display substrate and the display device provided by the embodiments of the present disclosure will be described in connection with the accompanying drawings.

Embodiment One

Figure 1:
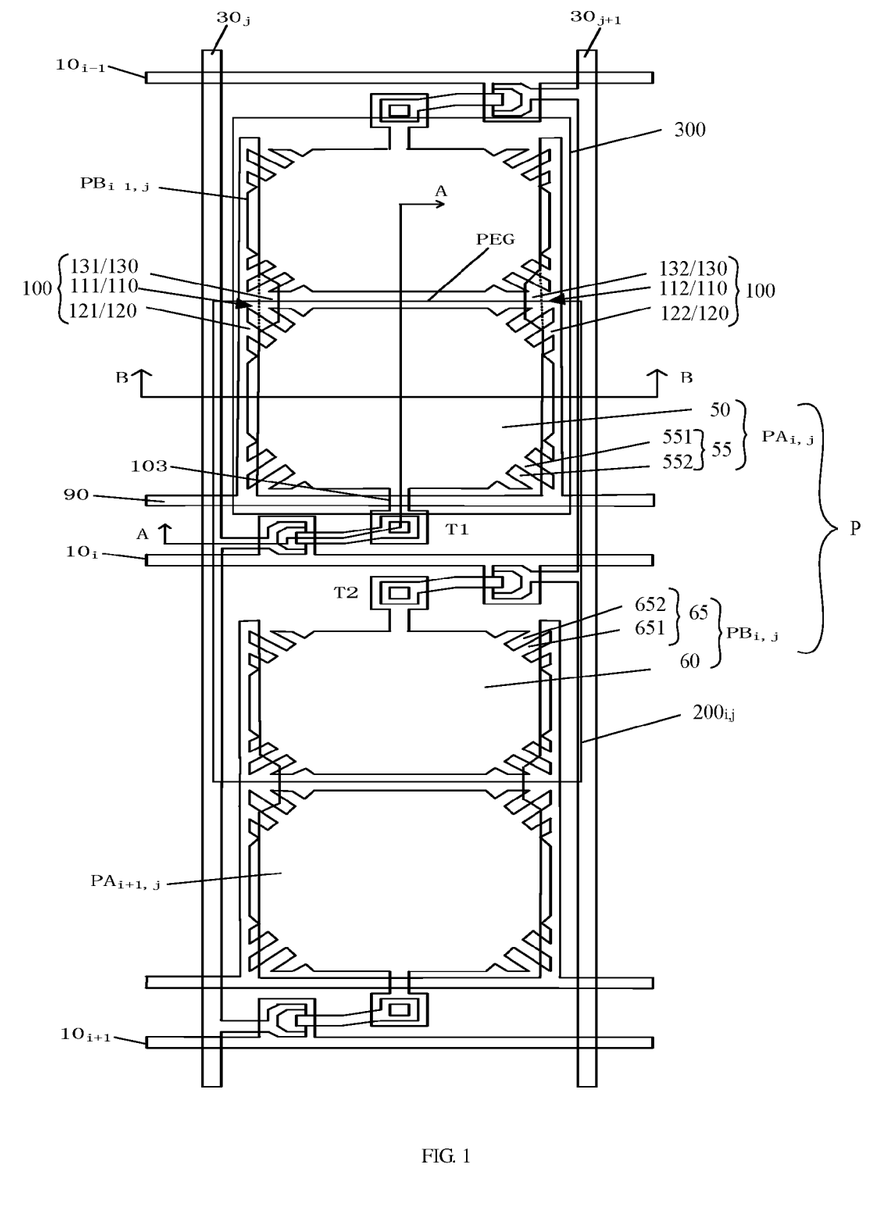
FIG. 1 is a structural schematic diagram of a display substrate provided by an embodiment of the present disclosure.
Figure 2:
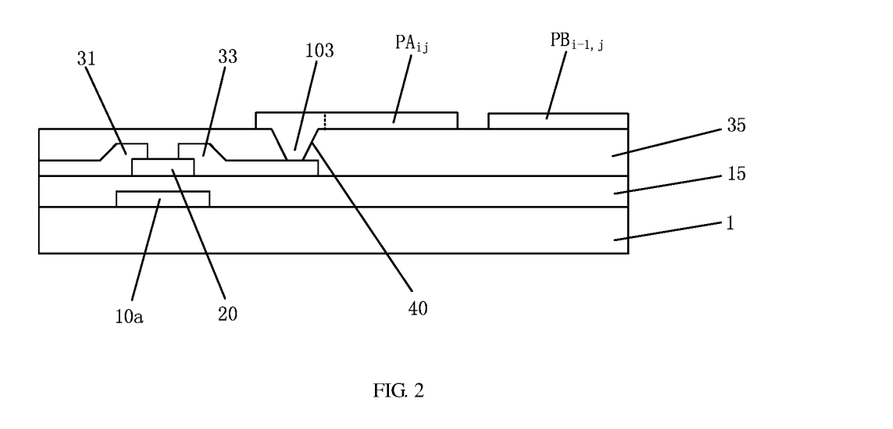
FIG. 2 is a cross-sectional view along an A-A direction in FIG. 1.
Figure 3:
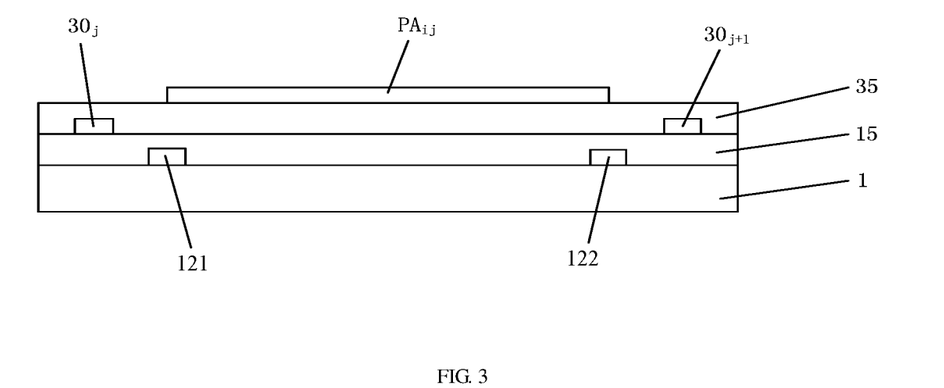
FIG. 3 is a cross-sectional view along a B-B direction in FIG. 1.

This embodiment provides a display substrate. FIG. 1 is a structural schematic diagram of a display substrate; FIG. 2 is a cross-sectional view along an A-A direction in FIG. 1; and FIG. 3 is a cross-sectional view along a B-B direction in FIG. 1. As shown in FIG. 1 to FIG. 3, the display substrate includes a base substrate 1, a pixel electrode P provided on the base substrate 1, and a light-shielding pattern 100. The pixel electrode P can include a first sub-pixel electrode PA and a second sub-pixel electrode PB arranged alternately, the first sub-pixel electrode PA can include a first trunk portion 50 and a first opening structure 55 provided in a periphery of the first trunk portion 50; the second sub-pixel electrode PB includes a second trunk portion 60 and a second opening structure 65 provided in a periphery of the second trunk portion 60; the light-shielding pattern 100 includes a first light-shielding portion 110, and the first light-shielding portion 110 is provided at an end portion of a gap PEG between the first sub-pixel electrode PA and the second sub-pixel electrode PB.

In the display substrate provided by this embodiment, since the first sub-pixel electrode and the second sub-pixel electrode include the first opening structure and the second opening structure, respectively; the first opening structure and the second opening structure adjacent to a region where the end portion of the gap between the first sub-pixel electrode and the second sub-pixel electrode is located, due to inconsistency of directions of the edge electric fields, will result in that liquid crystal molecules corresponding to the region deviate from a predetermined alignment direction. The light-shielding pattern is provided in the end portion of the gap between the first sub-pixel electrode and the second sub-pixel electrode, which can shield a region where light leakage occurs, so as to avoid occurrence of a light leakage phenomenon, and can further improve display quality of the display substrate and the display device using the same.

For example, as shown in FIG. 1 to FIG. 3, the first sub-pixel electrode PA includes a first interdigital structure 55 (e.g., a structure including a plurality of strip electrodes and a plurality of openings, the plurality of strip electrodes and the plurality of openings being alternately arranged) provided at four corners of the first sub-pixel electrode PA; the second sub-pixel electrode PB includes a second interdigital structure 65 provided at four corners of the second sub-pixel electrode PB, the first interdigital structure 55 and the second interdigital structure 65 on both sides of the end portion of the gap PEG between the first sub-pixel electrode PA and the second sub-pixel electrode PB have different opening directions, and thus, directions of electric fields formed thereby are also different. As a result, the liquid crystal molecules corresponding to the region will deviate from the predetermined alignment direction, and at this time, the light-shielding pattern 100 provided at the end portion of the gap between the first sub-pixel electrode PA and the second sub-pixel electrode PB can shield the region where light leakage occurs, so as to avoid occurrence of the light leakage phenomenon.

For example, in the display substrate provided by an example of the embodiment, opening directions of the first opening structure and the second opening structure on both sides of the end portion of the gap are different.

For example, in the display substrate provided by an example of the embodiment, as shown in FIG. 1 to FIG. 3, the first light-shielding portion 110 is further provided in a peripheral region of the end portion of the gap PEG between the first sub-pixel electrode PA and the second sub-pixel electrode PB. As a result, a light shielding area which the light-shielding pattern shields light leakage can be increased, to effectively avoid the occurrence of the light leakage phenomenon.

For example, in the display substrate provided by an example of the embodiment, the first opening structure may include a first interdigital structure or a first slit structure, and the second opening structure includes a second interdigital structure or a second slit structure.

For example, in the display substrate provided by an example of the Embodiment, as shown in FIG. 1 to FIG. 3, the light-shielding pattern 100 further includes a protruding portion 130 connected with the first light-shielding portion 110 and having a top protruding toward the gap PEG. As a result, the light-shielding pattern 100 can more effectively shield light.

Figure 4:
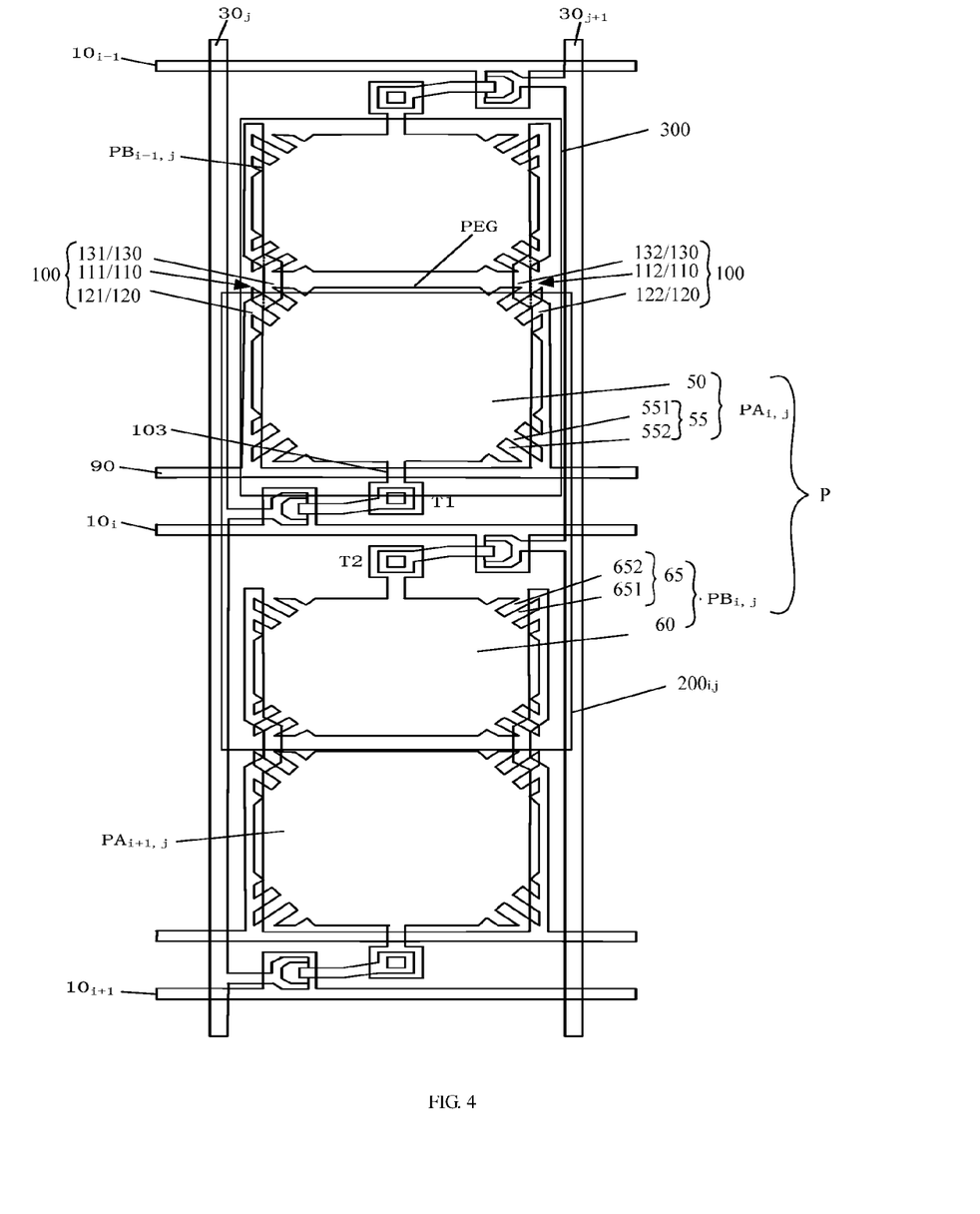
FIG. 4 is a structural schematic diagram of a display substrate provided by an embodiment of the present disclosure.

For example, in the display substrate provided by an example of the embodiment, as shown in FIG. 4, a position of the first light-shielding portion 110 corresponding to the protruding portion 130 is provided concavely toward the gap PEG.

Figure 5:
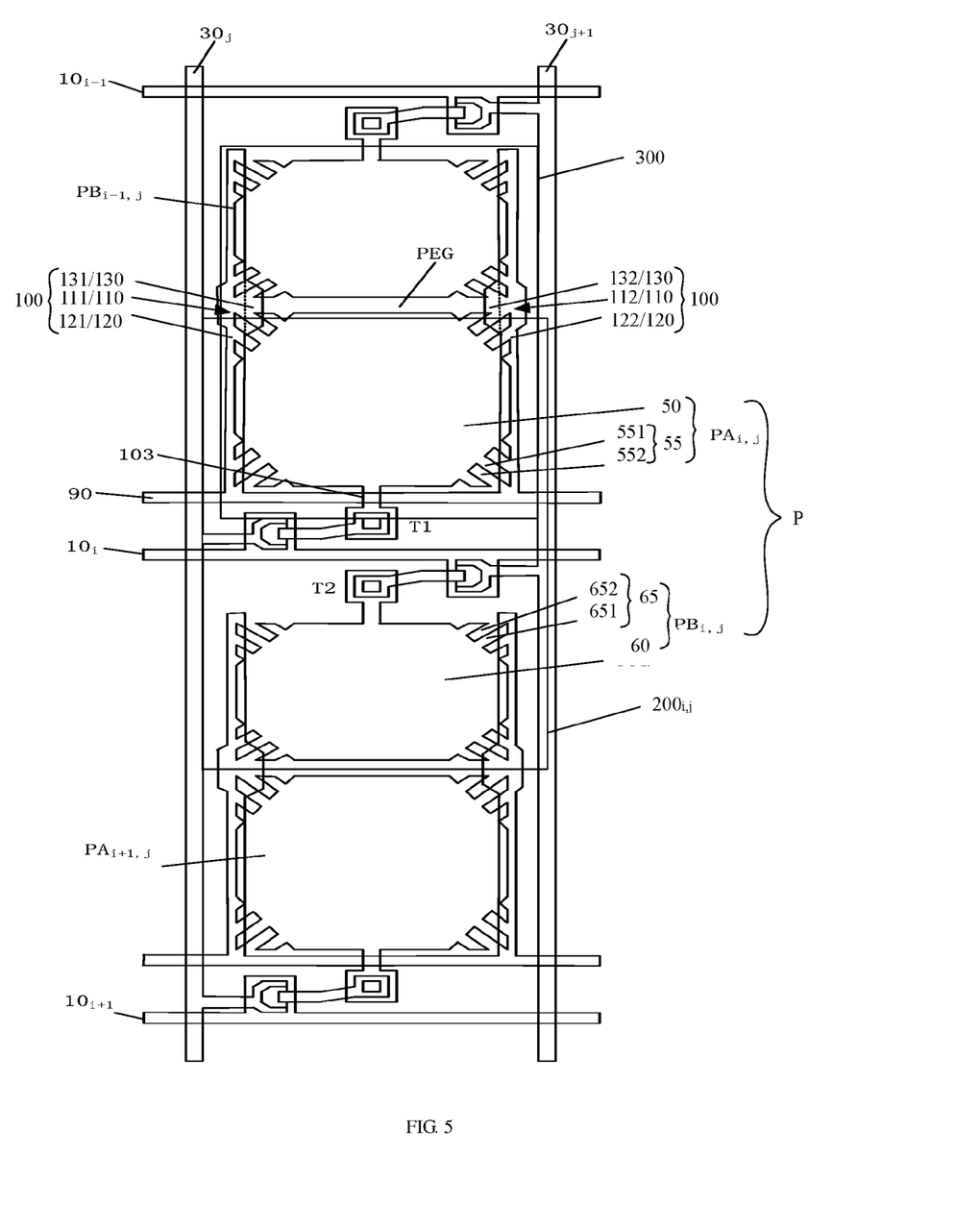
FIG. 5 is a structural schematic diagram of a display substrate provided by an embodiment of the present disclosure.

For example, in the display substrate provided by an example of the embodiment, as shown in FIG. 5, the position of the first light-shielding portion 110 corresponding to the protruding portion 130 is provided protruding away from the gap PEG.

For example, in the display substrate provided by an example of the embodiment, as shown in FIG. 1, FIG. 4 and FIG. 5, the protruding portion 130 can partly overlap the first sub-pixel electrode PA and the second sub-pixel electrode PB on both sides of the gap PEG.

For example, in the display substrate provided by an example of the embodiment, as shown in FIG. 1, FIG. 4 and FIG. 5, a shape of the protruding portion 130 can be a trapezoid, and of course, the embodiment of the present disclosure includes, but is not limited thereto, for example, the shape of the protruding portion can also be a triangle.

For example, in the display substrate provided by an example of the embodiment, as shown in FIG. 1, FIG. 4 and FIG. 5, a center line of the protruding portion 130 and a center line of the gap PEG coincide with each other.

Embodiment Two

On the basis of Embodiment One, this embodiment provides a display substrate. As shown in FIG. 1, FIG. 2 and FIG. 3, the display substrate includes a base substrate 1 and a gate line $10_i$, a data line $30_j$ and a pixel unit $200_{i,j}$ located above the base substrate 1, each pixel unit $200_{i,j}$ is provided therein with a first sub-pixel electrode $PA_{i,j}$ and a second sub-pixel electrode $PB_{i,j}$; a gate line $10_i$ being located between the first sub-pixel electrode $PA_{i,j}$ and the second sub-pixel electrode $PB_{i,j}$, where, i and j are both positive integers. In this embodiment, the gate line $10_i$ is arranged laterally and the data line $30_j$ is arranged longitudinally, wherein, the gate line $10_i$ represents a gate line of the i-th row, the data line $30_j$ represents data line of the j-th column, the pixel unit $200_{i,j}$ represents a pixel unit of the i-th row and the j-th column; the first sub-pixel electrode $PA_{i,j}$ represents a first sub-pixel electrode of the i-th row and the j-th column, and the second sub-pixel electrode $PB_{i,j}$ represents a second sub-pixel electrode of the i-th row and the j-th column. Adjacent gate lines and adjacent data lines enclose a display unit 300, each display unit 300 includes a first sub-pixel electrode in one pixel unit and a second sub-pixel electrode in the adjacent pixel unit; a preset region in the display unit 300 includes a light-shielding pattern 100. As shown in FIG. 1, for example, a gate line $10_i$ and a gate line $10_{i-1}$ adjacent to each other and a data line $30_j$ and a data line $30_{j+1}$ adjacent to each other enclose the display unit 300, the display unit 300 includes the first sub-pixel electrode $PA_{i,j}$ in one pixel unit and the second sub-pixel electrode $PB_{i-1,j}$ in an adjacent pixel unit.

It should be noted that, in the embodiment, the preset region is a region where light leakage occurs. And a light-shielding region is provided in the preset region, which can play a role in shielding light, so as to avoid the light leakage phenomenon.

For example, in the display substrate provided by an example of the embodiment, as shown in FIG. 1, the display substrate can further include a common electrode line 90, the common electrode line 90 is located between the first sub-pixel electrode $PA_{i,j}$ and the second sub-pixel electrode $PB_{i,j}$ in the pixel unit, and located between the first sub-pixel electrode $PA_{i,j}$ and the adjacent gate line $10_i$. For example, the common electrode line 90 and the gate line $10_i$ are arranged in a same layer. It should be noted that, the above-described common electrode line can be a storage electrode line.

For example, in the display substrate provided by an example of the embodiment, as shown in FIG. 1, the first sub-pixel electrodes $PA_{i,j}$ and the second sub-pixels electrode $PB_{i,j}$ are alternately arranged along a data line direction.

For example, in the display substrate provided by an example of the embodiment, the first sub-pixel electrode $PA_{i,j}$ and the second sub-pixel electrode $PB_{i,j}$ can be the same or different. When the first sub-pixel electrode $PA_{i,j}$ and the second sub-pixel electrode $PB_{i,j}$ are the same, the two have a same size and shape; when the first sub-pixel electrode $PA_{i,j}$ and the second sub-pixel electrode $PB_{i,j}$ are different, the two can have different sizes and/or shapes.

For example, in the display substrate provided by an example of the embodiment, as shown in FIG. 1, the first sub-pixel electrode $PA_{i,j}$ is a plate electrode having an edge interdigital structure, the first sub-pixel electrode $PA_{i,j}$ includes a plate electrode 50 and a interdigital structure 55, the interdigital structure 55 is located at an edge of the plate electrode 50; that is, the first sub-pixel electrode $PA_{i,j}$ can include a plate-like first trunk portion 50, and a first opening structure 55 provided in the periphery of the first trunk portion 50; for example, the interdigital structure 55 is located at four corners of the plate electrode 50. For example, the interdigital structure 55 includes interdigital electrodes 551 and openings 552 provided between the interdigital electrodes 551, and the opening 552 separates the interdigital electrodes 551 to form the interdigital structure 55.

For example, in the display substrate provided by an example of the embodiment, as shown in FIG. 1, the second sub-pixel electrode $PB_{i,j}$ is a plate electrode having an edge interdigital structure. The second sub-pixel electrode $PB_{i,j}$ includes a plate electrode 60 and an interdigital structure 65, the interdigital structure 65 is located at an edge of the plate electrode 60; that is, the second sub-pixel electrode $PB_{i,j}$ can include a plate-like second trunk portion 60 and a second opening structure 65 provided in the periphery of the first trunk portion 60, for example, the interdigital structure 65 is located at four corners of the plate electrode 60. For example, the interdigital structure 65 can include interdigital electrodes 651 and openings 652 provided between the interdigital electrodes 651, and the opening 652 separates the interdigital electrodes 651 to form the interdigital structure 65.

In the display substrate provided by the embodiment, the interdigital structure capable of generating an edge electric field can be applied to negative liquid crystal vertical arrangement display in which a chiral agent is doped, so that the negative liquid crystal molecule located between a common electrode and a pixel electrode is in a vertical arrangement state when power is not applied, and is in a twisted state when power is applied.

For example, in the display substrate provided by an example of the embodiment, as shown in FIG. 1, the light-shielding pattern 100 includes a first light-shielding portion 110; the preset region includes the end portion of the gap PEG between the first sub-pixel electrode $PA_{i,j}$ and the second sub-pixel electrode $PB_{i-1,j}$ in the display unit 300; the first light-shielding portion 110 partly overlaps the end portion of the gap PEG; for example, the first light-shielding portion 110 can be located below the end portion of the gap PEG. It should be noted that, the gap PEG refers to a gap between contours of the first sub-pixel electrode $PA_{i,j}$ and the second sub-pixel electrode $PB_{i-1,j}$ in the display unit 300, the gap PEG has two end portions, one is a left end portion close to the data line $30_j$, and the other is a right end portion close to the data line $30_{j+1}$. In addition, both end portions include edges of the first sub-pixel electrodes $PA_{i,j}$ and the second sub-pixel electrodes $PB_{i-1,j}$ adjacent to each other. Because the gap PEG has two end portions, the number of first light-shielding portions 110 can be two, that is, a first left light-shielding portion 111 and a first right light-shielding portion 112, respectively; the first left light-shielding portion 111 is located below the left end portion, and the first right light-shielding portion 112 is located below the right end portion. Of course, the first light-shielding portion 110 can also be located above the end portion region of the gap PEG, which will not be limited in the embodiment of the present disclosure here.

For example, in the display substrate provided by an example of the embodiment, the light-shielding pattern 100 can further include a branch portion 120 provided in the data line direction. The branch portion 120 can be connected with the first light-shielding portion 110 and extend in the data line direction.

For example, the first light-shielding portion 110 can be provided in a same layer as the common electrode line 90. For example, the branch portion 120 is a pattern extending from the common electrode line 90. In practical application, for example, the branch portion may also be a pattern not connected with the common electrode line 90, but a separately provided pattern, which will not be limited in the embodiment of the present disclosure here.

For example, the light-shielding pattern 100 can also include a protruding portion 130 connected with the first light-shielding portion 110 and having a top protruding toward the gap PEG. As shown in FIG. 1, the protruding portion 130 is a trapezoidal structure, that is, a projection of the protruding portion 130 on the base substrate 1 is a trapezoid. Of course, the protruding portion 130 can also be a structure of other shapes, for example, the shape of the protruding portion 130 is a triangle, a semicircle, or other irregular shape, which will not be limited in the embodiment of the present disclosure here. For example, the first light-shielding portion 110 and the protruding portion 130 can be integrally formed. It should be noted that, a dotted line between the first light-shielding portion 110 and the protruding portion 130 is only to show the two structures in a more clear way, but not an actual structure. Of course, the branch portion 120 may also be integrally formed with the first light-shielding portion 110 and the protruding portion 130, which will not be limited in the embodiment of the present disclosure here.

For example, in the display substrate provided by an example of the embodiment, the light-shielding pattern 100 includes a left branch portion 121 connected with the first left light-shielding portion 111 and extending in the data line direction. For example, the first left light-shielding portion 111 and the common electrode line 90 are provided in a same layer. In this case, the left branch portion 121 is a pattern extending from the common electrode line 90. Of course, the left branch portion 121 can also be a pattern not connected with the common electrode line 90, but a separately provided pattern, which will not be limited in the embodiment of the present disclosure here. For example, the light-shielding pattern 100 includes a left protruding portion 131 connected with the first left light-shielding portion 111 and having a top protruding toward the gap PEG. The left protruding portion 131 can be a trapezoidal structure. Of course, the left protruding portion 131 can also be a structure of other shapes, for example, the shape of the left protruding portion is a triangle, a semicircle, or other irregular shape, which will not be limited in the embodiment of the present disclosure here. For example, the first left light-shielding portion 111 can be integrally formed with the left protruding portion 131. It should be noted that, a dotted line between the first left light-shielding portion 111 and the left protruding portion 131 is only to show the two structures in a more clear way, but not an actual structure. It should be noted that, the light-shielding pattern 100 further includes a right branch portion 122 and a right protruding portion 132, for whose specific positional relationship and structures, description of the left branch portion 121 and the left protruding portion 131 can be referred to, which will not be repeated in the embodiment of the present disclosure here.

For example, in the display substrate provided by an example of the embodiment, as shown in FIG. 1, the protruding portion 130 is provided corresponding to the gap PEG; for example, a center line of the left protruding portion 131 and a center line of the gap PEG coincide with each other, the left protruding portion 131 has a symmetrical shape, and thus, a symmetrical center line of the left protruding portion 131 and the center line of the gap PEG coincide with each other. The right protruding portion 132 is provided corresponding to the gap PEG, for example, a center line of the right protruding portion 132 and the center line of the gap PEG coincide with each other, the right protruding portion 132 has a symmetrical shape, and thus, a symmetrical center line of the right protruding portion 132 and the center line of the gap PEG coincide with each other.

For example, in the display substrate provided by an example of the embodiment, the branch portion 120 and the data line 30 are provided overlapping or not overlapping each other, and the branch portion and the data line can be provided partially overlapping or completely overlapping each other in a width direction. For example, the right branch portion 122 located below the right end portion can be provided overlapping or not overlapping the data line $30_{j+1}$, and the left branch portion 121 located below the left end portion can be provided overlapping or not overlapping the data line $30_j$. For example, as shown in FIG. 1, the left branch portion 121 and the data line $30_j$ are provided not overlapping each other, and the right branch portion 122 and the data line $30_{j+1}$ are provided not overlapping each other.

For example, in the display substrate provided by an example of the embodiment, the protruding portion 130 can extend into the gap PEG. As shown in FIG. 1, the left protruding portion 131 extends into the gap PEG, and the right protruding portion 132 extends into the gap PEG. Of course, the protruding portion may not extend into the gap, which will not be limited in the embodiment of the present disclosure here.

For example, when the protruding portion extends into the gap, the protruding portion overlaps the first sub-pixel electrode $PA_{i,j}$ and the second sub-pixel electrode $PB_{i-1,j}$ on both sides of the gap PEG; for example, as shown in FIG. 1, the left protruding portion 131 is located below the interdigital structure 55 of the first sub-pixel electrode $PA_{i,j}$ and the interdigital structure 65 of the second sub-pixel electrode $PB_{i-1,j}$ on both sides of the gap PEG, and the right protruding portion 132 is located below the interdigital structure 55 of the first sub-pixel electrode $PA_{i,j}$ and the interdigital structure 65 of the second sub-pixel electrode $PB_{i-1,j}$ on both sides of the gap PEG. Of course, the protruding portions may not overlap the first sub-pixel electrode $PA_{i,j}$ and the second sub-pixel electrode $PB_{i-1,j}$ on both sides of the gap PEG, which will not be limited in the embodiment of the present disclosure here.

For example, as shown in FIG. 1 and FIG. 2, each pixel unit 200 is provided therein with a first thin film transistor T1 and a second thin film transistor T2, and the first sub-pixel electrode $PA_{i,j}$ is connected with the data line $30_j$ through the first thin film transistor T1, and the second sub-pixel electrode $PB_{i,j}$ is connected with the data line $30_{j+1}$ through the second thin film transistor T2, and the data line $30_j$ and the data line $30_{j+1}$ are arranged adjacent to each other. As shown in FIG. 2, taking the first thin film transistor T1 as an example, the first thin film transistor T1 includes a gate electrode 10*a*, an active layer 20, a source electrode 31, a drain electrode 33; the gate electrode 10*a* is located above the base substrate 1, the gate electrode 10*a* is connected and integrally formed with the gate line $10_i$, and on the gate line 10, and the gate electrode 10*a* are provided a gate insulating layer 15 which covers the entire base substrate 1; the active layer 20 is located above the gate insulating layer 15 and above the gate electrode 10*a*, the source electrode 31 and the drain electrode 33 are located above the active layer 20 and connected with the active layer 20, the source electrode 31 and the drain electrode 33 are provided on a same layer; the source electrode 31 is connected and integrally formed with the data line $30_j$; on the source electrode 31 and the drain electrode 33 are provided a passivation layer 35 which covers the entire base substrate 1; in the passivation layer 35 is provided a via hole 40 located above the drain electrode 33; a sub-pixel electrode connection structure 103 is filled in the via hole 40 and is in contact with the drain electrode 33, the sub-pixel electrode connection structure 103 is connected and integrally formed with the first sub-pixel electrode $PA_{i,j}$, and thus, the first sub-pixel electrode $PA_{i,j}$ is connected with the drain electrode 33 through the sub-pixel electrode connection structure 103.

For example, as shown in FIG. 1 and FIG. 3, the left branch portion 121 and the right branch portion 132 are located above the base substrate 1, the gate insulating layer 15 is located above the left branch portion 121 and the right branch portion 132, the data line $30_j$ and the data line $30_{j+1}$ are located above the gate insulating layer 15, the left branch portion 121 is close to the data line $30_j$, the right branch portion 132 is close to the data line $30_{j+1}$, the passivation layer 35 is located above the data line $30_j$ and the data line $30_{j+1}$, and the first sub-pixel electrode $PA_{i,j}$ is located above the passivation layer 35.

For example, as shown in FIG. 1, at the end portion of the gap PEG, arrangement directions of the interdigital structure 55 of the first sub-pixel electrode $PA_{i,j}$ and the interdigital structure 65 of the second sub-pixel electrode $PB_{i-1,j}$ are inconsistent, resulting in light leakage of the end portion of the gap PEG; in this embodiment, the first light-shielding portion 110 overlaps the end portion of the gap PEG, the first light-shielding portion 110 can play a role in shielding light from the end portion, which avoids a problem of light leakage caused by deviation of arrangement of the liquid crystal molecules under an action of the edge electric field of the interdigital structures of the two sub-pixel electrodes from a predetermined alignment direction, so as to avoid the light leakage phenomenon. In addition, the branch portion 120 can be a pattern extending from the common electrode line, so that the light leakage phenomenon can be well avoided, and the protruding portion 130 can further avoid the light leakage phenomenon.

For example, at the end portion of the gap PEG, arrangement directions of the interdigital structure 55 of the first sub-pixel electrode $PA_{i,j}$ and the interdigital structure 65 of the second sub-pixel electrode $PB_{i+1,j}$ are inconsistent, resulting in light leakage of the peripheral region of the end portion of the gap PEG; In this case, the preset region includes the peripheral region of the end portion of the gap between the first sub-pixel electrode and the second sub-pixel electrode in the display unit, the first light-shielding portion overlaps the peripheral region of the end portion of the gap, the first light-shielding portion plays a role in shielding light for the peripheral region of the end portion, which avoids the problem of light leakage caused by deviation of arrangement of the liquid crystal molecules under the action of the edge electric field of the interdigital structures of the two sub-pixel electrodes from the predetermined alignment direction, so as to avoid the light leakage phenomenon. It is not limited in the embodiment of the present disclosure here.

For example, at the end portion of the gap PEG, arrangement directions of the interdigital structure of the first sub-pixel electrode $PA_{i,j}$ and the interdigital structure of the second sub-pixel electrode $PB_{i-1,j}$ are inconsistent, resulting in light leakage of both the end portion of the gap PEG and the peripheral region of the end portion of the gap PEG; in this case, the preset region can include the end portion of the gap between the first sub-pixel electrode and the second sub-pixel electrode in the display unit, and the peripheral region of the end portion of the gap, the first light-shielding portion overlaps both the end portion of the gap and the peripheral region of the end portion of the gap, the first light-shielding portion plays a role in shielding light for the end portion and the peripheral region of the end portion, which avoids the problem of light leakage caused by deviation of arrangement of the liquid crystal molecules under the action of the edge electric field of the interdigital structures of the two sub-pixel electrodes from the predetermined alignment direction, so as to avoid the light leakage phenomenon.

In the display substrate provided by this embodiment, adjacent gate lines and adjacent data lines enclose a display unit, each display unit includes a first sub-pixel electrode in one pixel unit and a second sub-pixel electrode in an adjacent pixel unit, and a preset region in the display unit includes a light-shielding pattern; and the light-shielding pattern plays a role in shielding light from the preset region, so as to avoid the light leakage phenomenon. In addition, by providing two sub-pixel electrodes in the display unit and connecting different data lines, respectively, a viewing angle of the display unit can be further improved.

Embodiment Three

The embodiment provides a display substrate. FIG. 4 is a structural schematic diagram of a display substrate; as shown in FIG. 4, the display substrate differs from that of the above-described Embodiment Two in that, a position of a first light-shielding portion 110 corresponding to a protruding portion 130 is provided concavely toward a gap PEG. For description of remaining structures, the above-described embodiments may be referred to, which will not be repeated in the embodiment of the present disclosure here.

For example, as shown in FIG. 4, a position of a first left light-shielding portion 111 corresponding to a left protruding portion 131 is provided concavely toward the gap PEG, and a position of a first right light-shielding portion 112 corresponding to a right protruding portion 132 is provided concavely toward the gap PEG In the display substrate provided by this embodiment, adjacent gate lines and adjacent data lines enclose a display unit, each display unit includes a first sub-pixel electrode in one pixel unit and a second sub-pixel electrode in an adjacent pixel unit, and a preset region in the display unit includes a light-shielding pattern; and the light-shielding pattern plays a role in shielding light from the preset region, so as to avoid the light leakage phenomenon.

Embodiment Four

The embodiment provides a display substrate. FIG. 5 is a structural schematic diagram of a display substrate; as shown in FIG. 5, the display substrate differs from that of the above-described Embodiment Two in that, a position of a first light-shielding portion 110 corresponding to a protruding portion 130 is provided protruding away from the gap PEG. For description of remaining structures, the above-described embodiments may be referred to, which will not be repeated in the embodiment of the present disclosure here.

For example, as shown in FIG. 5, a position of a first left light-shielding portion 111 corresponding to the left protruding portion 131 is provided protruding and facing away from a gap PEG, and a position of a first right light-shielding portion 112 corresponding to the right protruding portion 132 is provided protruding away from the gap PEG.

In the display substrate provided by this embodiment, adjacent gate lines and adjacent data lines enclose a display unit, each display unit includes a first sub-pixel electrode in one pixel unit and a second sub-pixel electrode in an adjacent pixel unit, and a preset region in the display unit includes a light-shielding pattern; and the light-shielding pattern plays a role in shielding light from the preset region, so as to avoid the light leakage phenomenon.

Embodiment Five

Figure 6:
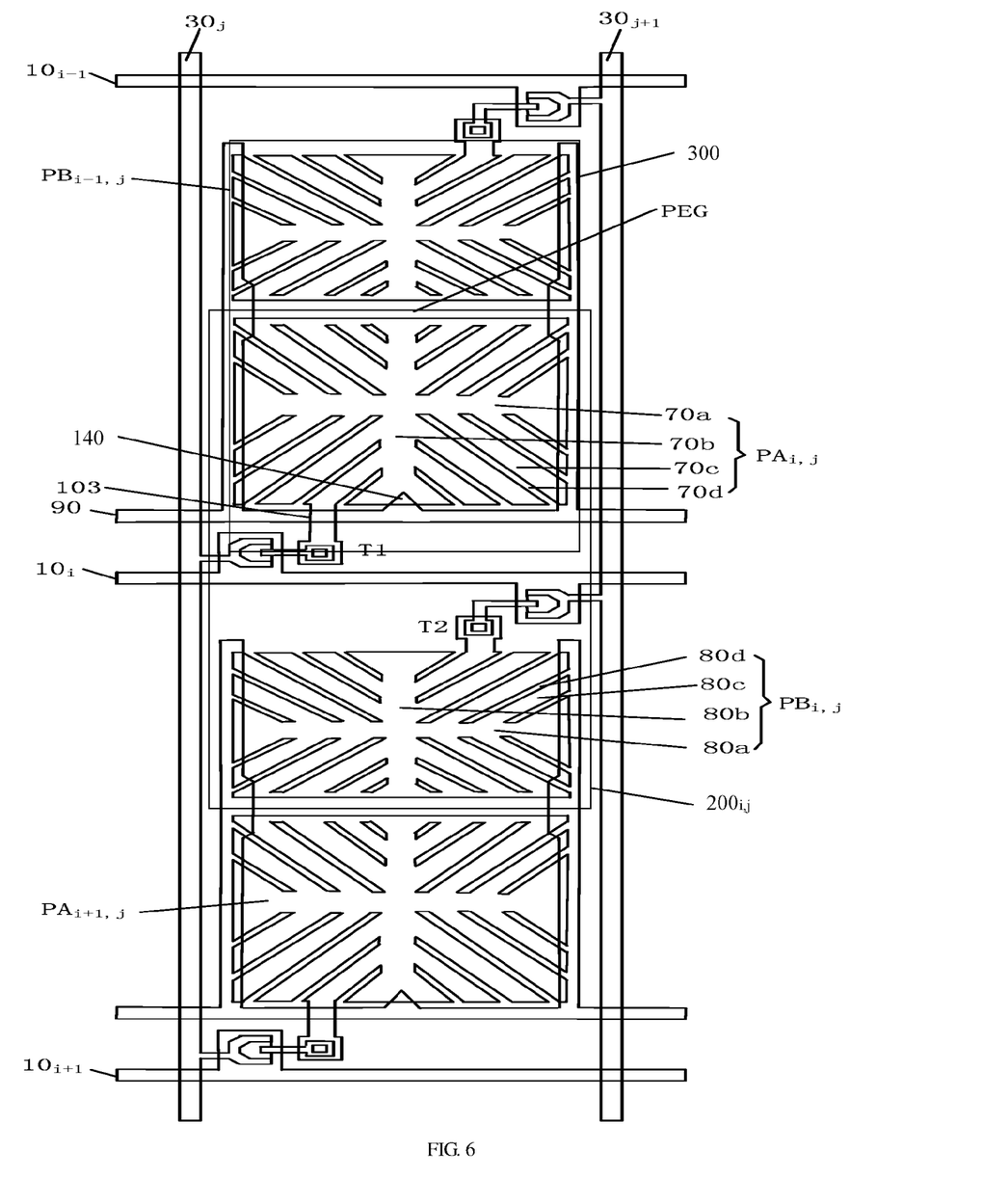
FIG. 6 is a structural schematic diagram of a display substrate provided by an embodiment of the present disclosure.

The embodiment provides a display substrate. FIG. 6 is a structural schematic diagram of a display substrate; as shown in FIG. 6, the display substrate differs from that of the above-described Embodiment Two in that: in this embodiment, a first sub-pixel electrode $PA_{i,j}$ in a display unit includes two root portions arranged intersecting with each other and a plurality of branch electrodes 70c provided on the root portion, and the branch electrodes 70c being provided with slits 70d therebetween; the two root portions arranged intersecting with each other are respectively root portion 70a and root portion 70b; that is, the first trunk portion includes root portions, and the first opening structure includes branch electrodes 70c and slits 70d. For example, the root portion 70a can be arranged laterally, the root portion 70b can be arranged longitudinally, and the slits 70d separate the branch electrodes 70c. A light-shielding pattern 100 includes a second light-shielding portion 140, a preset region includes at least one end portion of at least one root portion, and the second light-shielding portion 140 overlaps at least one end portion of at least one root portion. As shown in FIG. 6, the number of second light-shielding portion 140 is one, and the second light-shielding portion 140 overlaps end portions, away from the gap PEG, of the root portions 70b provided along the data line $30_j$; for example, the second light-shielding portion 140 is located below the end portions, away from the gap PEG, of the root portions 70b provided along the data line $30_j$. Of course, an end portion of the root portion 70b close to the gap PEG can overlap the second light-shielding portion 140, and both end portions of the root portion 70a can also overlap the second light-shielding portion 140, which will not be limited in the embodiment of the present disclosure here.

For example, as shown in FIG. 6, the second light-shielding portion 140 can be a pattern extending from the common electrode line 90. Of course, the second light-shielding portion can be a pattern without being connected with the common electrode line, but a separately provided pattern, which will not be limited in the embodiment of the present disclosure here.

For example, in the display substrate provided by an example of the embodiment, the second sub-pixel electrode $PB_{i,j}$ of the display unit includes two root portions arranged intersecting with each other and a plurality of branch electrodes 80c provided on the root portions, and the branch electrodes 80c being provided with slits 80d therebetween; the two root portions arranged intersecting with each other are respectively root portion 80a and root portion 80b; that is, the second trunk portion is root portions, and a second opening structure includes branch electrodes 70c and slits 70d. The root portion 80a is arranged laterally, the root portion 80b is arranged longitudinally, and the slits 80d separate the branch electrodes 80c.

For example, in the display substrate provided by an example of the embodiment, the first sub-pixel electrode $PA_{i,j}$ is a fine slit electrode, and the second sub-pixel electrode $PB_{i,j}$ is a fine slit electrode. The fine slit electrode can be adopted for Polymer Stabilized Vertical Alignment (PSVA) display; a negative liquid crystal is doped with an ultraviolet-light polymerizable mesogenic monomer; the negative liquid crystal molecules located between a common electrode and a pixel electrode is in a vertical arrangement state when power is not applied, and is in an inclined state when power is applied; by irradiating the negative liquid crystal doped with the ultraviolet-light polymerizable mesogenic monomer with ultraviolet light, polymerization reaction occurs to the mesogenic monomer, so that the negative liquid crystal molecules obtain a predetermined inclination angle.

For example, in the display substrate provided by an example of the embodiment, at the end portion of the root portion, arrangement directions of the branch electrodes provided on both sides of the root portion are inconsistent, resulting in light leakage of the end portion of the root portion, in the embodiment, the second light-shielding portion overlaps the end portion of the root portion, and the second light-shielding portion plays a role in shielding light from the end portion, which avoids the problem of light leakage caused by deviation of arrangement of the liquid crystal molecules under the action of the edge electric field of the branch electrodes on both sides from the predetermined alignment direction, so as to avoid a light leakage phenomenon. The second light-shielding portion is a pattern extending from the common electrode line, so that the light leakage phenomenon can be well avoided.

For example, at the end portion of the root portion, arrangement directions of the branch electrodes (slits) provided on both sides of the root portion are inconsistent, resulting in light leakage of the peripheral region of the end portion of the root portion; In this case, the preset region includes a peripheral region of at least one end portion of at least one of the root portions, the second light-shielding portion overlaps a peripheral region of at least one end portion of at least one of the root portions, the second light-shielding portion plays a role in shielding light from the peripheral region of the end portion, which avoids the problem of light leakage caused by deviation of arrangement of the liquid crystal molecules under the action of the edge electric field of the branch electrodes on both sides from the predetermined alignment direction, so as to avoid a light leakage phenomenon. The second light-shielding portion is a pattern extending from the common electrode line, so that the light leakage phenomenon can be well avoided. It is not limited in the embodiment of the present disclosure here.

For example, at the end portion of the root portion, arrangement directions of the branch electrodes provided on both sides of the root portion are inconsistent, resulting in light leakage of the end portion of the root portion and the peripheral region of the end portion of the root portion; In this case, the preset region includes at least one end portion of at least one of the root portions and a peripheral region of the end portion, the second light-shielding portion overlaps at least one end portion of the at least one root portion and the peripheral region of the end portion, the second light-shielding portion plays a role in shielding light from the end portion and the peripheral region of the end portion, which avoids the problem of light leakage caused by deviation of arrangement of the liquid crystal molecules under the action of the edge electric field of the branch electrodes on both sides from the predetermined alignment direction, so as to avoid a light leakage phenomenon. The second light-shielding portion is a pattern extending from the common electrode line, so that the light leakage phenomenon can be well avoided.

For example, in the display substrate provided by the embodiment, adjacent gate lines and adjacent data lines enclose a display unit, each display unit includes a first sub-pixel electrode in one pixel unit and a second sub-pixel electrode in the adjacent pixel unit; and a preset region in the display unit includes a light-shielding pattern; the light-shielding pattern plays a role in shielding light from the preset region, so as to avoid the light leakage phenomenon. The second light-shielding portion can play a role in shielding light from the end portion of the root portion and/or the peripheral region of the end portion, so as to avoid the light leakage phenomenon.

Embodiment Six

The embodiment provides a display device, the display device including a counter substrate and a display substrate provided opposite to each other.

For example, in the display device provided by an example of the embodiment, the display substrate can be the display substrate as described in the above-described Embodiment One, Embodiment Two, Embodiment Three, Embodiment Four, or Embodiment Five.

For example, in the display device provided by an example of the embodiment, the display substrate can be an array substrate, and the counter substrate can be a color filter substrate.

In the display device provided by the embodiment, adjacent gate lines and adjacent data lines enclose a display unit, each display unit includes a first sub-pixel electrode in one pixel unit and a second sub-pixel electrode in an adjacent pixel unit, and a preset region in the display unit includes a light-shielding pattern; and the light-shielding pattern plays a role in shielding light from the preset region, so as to avoid a light leakage phenomenon.

Embodiment Seven

Embodiment Seven of the present disclosure provides a fabrication method of a display substrate, the method including:

Step 101: forming a gate line, a gate electrode, a common electrode line, and a light-shielding pattern on a base substrate.

For example, a gate metal layer is sputtered on the base substrate, and a patterning process is performed on the gate metal layer to form a gate line, a gate electrode, a common electrode line and a light-shielding pattern. Therein, a material of the gate metal layer can include a metal material such as Cu, Al, Mo, Ti, Cr or W, or an alloy of the above materials; the gate metal layer may be a single-layer structure or a multilayer structure, e.g., Mo\Al\Mo, Ti\Cu\Ti or Mo\Ti\Cu.

Step 102: forming a gate insulating layer on the base substrate on which step 101 is completed.

For example, the gate insulating layer is deposited on the base substrate on which step 101 is completed. Therein, a material of the gate insulating layer can include silicon nitride or silicon oxide; and the gate insulating layer can be a single-layer structure or a multilayer structure, e.g., silicon oxide\silicon nitride.

Step 103: forming an active layer on the gate insulating layer, the active layer being located above the gate electrode.

For example, an active material layer is formed on the gate insulating layer, and a patterning process is performed on the active material layer to form the active layer. Therein, a material of the active layer includes amorphous silicon, polysilicon, microcrystalline silicon or oxide semiconductor, e.g., a-Si, n+a-Si or IGZO.

Step 104: forming a data line, a source electrode and a drain electrode on the base substrate on which step 103 is completed.

For example, a source-drain metal layer is deposited on the base substrate on which step 103 is completed, and a patterning process is performed on the source-drain metal layer to form the data line, the source electrode and the drain electrode. Therein, a material of the source-drain metal layer can include a metal material such as Cu, Al, Mo, Ti, Cr or W, or an alloy of the above materials; and the source-drain metal layer can be a single-layer structure or a multilayer structure, e.g., Mo\Al\Mo, Ti\Cu\Ti or Mo\Ti\Cu.

Step 105: forming a passivation layer on the base substrate on which step 104 is completed.

For example, the passivation layer is deposited on the base substrate on which step 104 is completed. Therein, a material of the passivation layer can be an inorganic material, e.g., silicon nitride or silicon oxide; and the material of the passivation layer can be an organic material, e.g., an organic resin material.

Step 106: forming a via hole in the passivation layer, the via hole being located above the drain electrode.

For example, a patterning process is performed on the passivation layer, and the via hole is formed in the passivation layer, to expose the drain electrode.

Step 107: forming a first sub-pixel electrode, a second sub-pixel electrode, and a sub-pixel electrode connection structure on the base substrate on which step 106 is completed.

For example, a conductive material layer is sputtered on the base substrate on which step 106 is completed, and a patterning process is performed on the conductive material layer to form the first sub-pixel electrode, the second sub-pixel electrode, and the sub-pixel electrode connection structure. Therein, a material of the conductive material layer can include a transparent metal oxide, e.g., ITO or IZO.

An execution order of respective steps in this embodiment is only an example; in practical application, the execution order of respective steps can be varied according to variation of the structure in the display substrate, which will no longer be enumerated one by one here.

The fabrication method of the display substrate provided by the embodiment can be used for fabricating the display substrate provided by Embodiment One, Embodiment Two, Embodiment Three, Embodiment Four, or Embodiment Five as described above.

The foregoing embodiments merely are exemplary embodiments of the present disclosure, and not intended to define the scope of the present disclosure, and the scope of the present disclosure is determined by the appended claims.

The present application claims priority of Chinese Patent Application No. 201521108609.7 filed on Dec. 28, 2015, the disclosure of which is incorporated herein by reference in its entirety as part of the present application.

The invention claimed is:

1. A display substrate, comprising:
a base substrate;
a pixel electrode, provided on the base substrate; and
a light-shielding pattern,
wherein, the pixel electrode comprises first sub-pixel electrodes and second sub-pixel electrodes arranged alternately, the first sub-pixel electrode comprises a first trunk portion and a first opening structure provided in a periphery of the first trunk portion, the second sub-pixel electrode comprises a second trunk portion and a second opening structure provided in a periphery of the second trunk portion, the light-shielding pattern comprises a first light-shielding portion, and the first light-shielding portion is provided at an end portion of a gap between the first sub-pixel electrode and the second sub-pixel electrode,
wherein in a plan view of the display substrate, the gap is between a first straight boundary of the first sub-pixel electrode and a second straight boundary of the second sub-pixel electrode, the first straight boundary and the second straight boundary face to each other and parallel with each other, a middle portion of the gap is unshielded by the light-shielding pattern,
wherein the light-shielding pattern further comprises a protruding portion connected with the first light-shielding portion and having a top protruding toward the gap,
wherein a shape of the protruding portion comprises a trapezoid or a triangle.

2. The display substrate according to claim 1, wherein, opening directions of the first opening structure and the second opening structure on both sides of the end portion of the gap are different.

3. The display substrate according to claim 1, wherein, a position of the first light-shielding portion corresponding to the protruding portion is provided concavely toward the gap, or, the position of the first light-shielding portion corresponding to the protruding portion is provided protruding away from the gap.

4. The display substrate according to claim 1, wherein, the protruding portion partly overlaps the first sub-pixel electrode and the second sub-pixel electrode on both sides of the gap.

5. The display substrate according to claim 1, wherein, a center line of the protruding portion and a center line of the gap coincide with each other.

6. The display substrate according to claim 1, further comprising:
gate lines, data lines and pixel units located above the base substrate,
wherein, each of the pixel units is provided therein with the first sub-pixel electrode and the second sub-pixel electrode, the gate line is located between the first sub-pixel electrode and the second sub-pixel electrode, adjacent gate lines and adjacent data lines enclose a display unit, each of the display units comprises the first sub-pixel electrode in one of the pixel units and the second sub-pixel electrode in adjacent pixel unit thereto.

7. The display substrate according to claim 6, wherein, the light-shielding pattern further comprises a branch portion connected with the first light-shielding portion and extending in a data line direction.

8. The display substrate according to claim 7, wherein, the branch portion and the data line are provided overlapping each other.

9. A display substrate, comprising:
a base substrate;
a pixel electrode, provided on the base substrate; and
a light-shielding pattern,
wherein, the pixel electrode comprises first sub-pixel electrodes and second sub-pixel electrodes arranged alternately, wherein, the first sub-pixel electrode comprises two root portions arranged intersecting with each other and a plurality of branch electrodes provided on the root portions with a slit therebetween, the second sub-pixel electrode comprises two root portions arranged intersecting with each other and a plurality of branch electrodes provided on the root portions with a slit therebetween,
the light-shielding pattern comprises:
a first light-shielding portion, provided at an end portion of a gap between the first sub-pixel electrode and the second sub-pixel electrode;
a protruding portion connected with the first light-shielding portion and having a top protruding toward the gap and overlapping with the branch electrodes of the first sub-pixel electrode and the second sub-pixel electrode; and
a second light-shielding portion overlapping at least one end portion of at least one of the root portions,
wherein the second light-shielding portion further overlaps a peripheral region of at least one end portion of the at least one of the root portions,
wherein the second light-shielding portion further overlaps an end portion, away from the gap, of the root portion provided in a data line direction.

10. The display substrate according to claim 9, wherein, the second light-shielding portion further overlaps a peripheral region of the end portion, away from the gap, of the root portion provided in the data line direction.

11. The display substrate according to claim 9, wherein, a shape of the second light-shielding portion comprises a trapezoid or a triangle.

12. The display substrate according to claim 7, further comprising:
a common electrode line, wherein, the common electrode line is located between the first sub-pixel electrode and the second sub-pixel electrode in the pixel unit, and located between the first sub-pixel electrode and adjacent gate line thereto, and the branch portion is a pattern extending from the common electrode line, the branch portion is physically and electronically connected with the common electrode line.

13. The display substrate according to claim 9, further comprising:
a common electrode line, wherein, the common electrode line is located between the first sub-pixel electrode and the second sub-pixel electrode in the pixel unit, and located between the first sub-pixel electrode and adjacent gate line thereto, and the second light-shielding portion is a pattern extending from the common electrode line, the branch portion is physically and electronically connected with the common electrode line.

14. A display device, comprising:
a display substrate; and
a counter substrate, provided opposite to the display substrate,
wherein, the display substrate comprises the display substrate according to claim 1.

15. The display substrate according to claim 1, wherein the first sub-pixel electrode and the second sub-pixel electrode are electrically insulated from each other.

16. The display substrate according to claim 1, wherein the light-shielding pattern further comprises a second light-shielding portion overlapping with an end portion of the first sub-pixel electrode away from the gap.

* * * * *